US009544180B2

(12) United States Patent
Neelakantan et al.

(10) Patent No.: US 9,544,180 B2
(45) Date of Patent: Jan. 10, 2017

(54) TECHNIQUES FOR GROUP MESSAGING ON A MOBILE COMPUTING DEVICE

(75) Inventors: Radha Neelakantan, Sunnyvale, CA (US); Benoit Boningue, Mountain View, CA (US); Richard J. Donald, Brentwood, CA (US); Manisha D. Parekh, Mountain View, CA (US); Ryan Case, Sunnyvale, CA (US); Peter Fry, Andover, MA (US); David G. Champlin, San Diego, CA (US); Lang S. Chen, Oakland, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1164 days.

(21) Appl. No.: 11/849,211

(22) Filed: Aug. 31, 2007

(65) Prior Publication Data

US 2009/0061825 A1    Mar. 5, 2009

(51) Int. Cl.
| | |
|---|---|
| *H04L 29/12* | (2006.01) |
| *H04L 12/58* | (2006.01) |
| *H04W 4/08* | (2009.01) |

(52) U.S. Cl.
CPC ......... *H04L 29/12292* (2013.01); *H04L 51/38* (2013.01); *H04L 61/2069* (2013.01); *H04L 51/28* (2013.01); *H04W 4/08* (2013.01)

(58) Field of Classification Search
CPC ........ G06Q 10/107; H04L 51/14; H04L 12/58
USPC ...... 455/405, 412.1, 459, 466, 518; 370/341
See application file for complete search history.

(56) References Cited

U.S. PATENT DOCUMENTS

| | | | |
|---|---|---|---|
| 6,430,624 B1 | 8/2002 | Jamtgaard et al. | |
| 6,463,462 B1 * | 10/2002 | Smith | G06Q 10/107 709/206 |
| 6,549,612 B2 | 4/2003 | Gifford et al. | |
| 6,704,712 B1 | 3/2004 | Bleiweiss | |
| 6,714,969 B1 | 3/2004 | Klein et al. | |
| 6,970,697 B2 | 11/2005 | Kouznetsov et al. | |
| 7,693,534 B1 * | 4/2010 | Lundy et al. | 455/518 |
| 2001/0027111 A1 * | 10/2001 | Motegi | H04W 4/08 455/519 |
| 2002/0059368 A1 | 5/2002 | Reynolds | |
| 2002/0103881 A1 | 8/2002 | Granade et al. | |

(Continued)

OTHER PUBLICATIONS

PCT International Search Report, PCT Application No. PCT/US08/70791, Oct. 22, 2008, 3 pages.

*Primary Examiner* — Myron K Wyche
(74) *Attorney, Agent, or Firm* — Norton Rose Fulbright US LLP

(57) ABSTRACT

Techniques for group messaging on a mobile computing device are described. An apparatus may comprise a message server to communicate messages between multiple mobile computing devices. The message server may have a group message management module to establish a group messaging session between the multiple mobile computing devices. The group message management module may have a group generating module to receive a message with a group message indicator and identifying information for multiple mobile computing devices within the message. The group generating module may form a message group to communicate messages from any one of the mobile computing devices to all of the mobile computing devices for the group messaging session. Other embodiments are described and claimed.

30 Claims, 7 Drawing Sheets

(56) References Cited

U.S. PATENT DOCUMENTS

| | | | |
|---|---|---|---|
| 2003/0021290 A1* | 1/2003 | Jones | H04L 12/58 370/466 |
| 2003/0114174 A1* | 6/2003 | Walsh et al. | 455/466 |
| 2004/0078372 A1 | 4/2004 | Huuskonen | |
| 2004/0205156 A1 | 10/2004 | Aarts et al. | |
| 2005/0195788 A1* | 9/2005 | Villain | H04L 51/14 370/341 |
| 2007/0014202 A1* | 1/2007 | Hanks et al. | 369/44.11 |
| 2007/0142029 A1* | 6/2007 | Willehadson et al. | 455/405 |
| 2007/0156824 A1* | 7/2007 | Thompson | G06Q 10/107 709/206 |
| 2009/0176518 A1* | 7/2009 | Doni | 455/466 |

\* cited by examiner

TECHNIQUES FOR GROUP MESSAGING ON A MOBILE COMPUTING DEVICE

BACKGROUND

A mobile computing device such as a combination handheld computer and mobile telephone or smart phone generally may provide voice and data communications functionality, as well as computing and processing capabilities. In addition to supporting telephone and voicemail services, a mobile computing device may support various other types of mobile messaging services such as facsimile, electronic mail (email), instant messaging (IM), short message service (SMS) messaging, multimedia message service (MMS) messaging, video conferencing, and so forth. Accordingly, there may be a need for an improved apparatus and methods for providing enhanced mobile messaging services.

DETAILED DESCRIPTION

Figure 1:
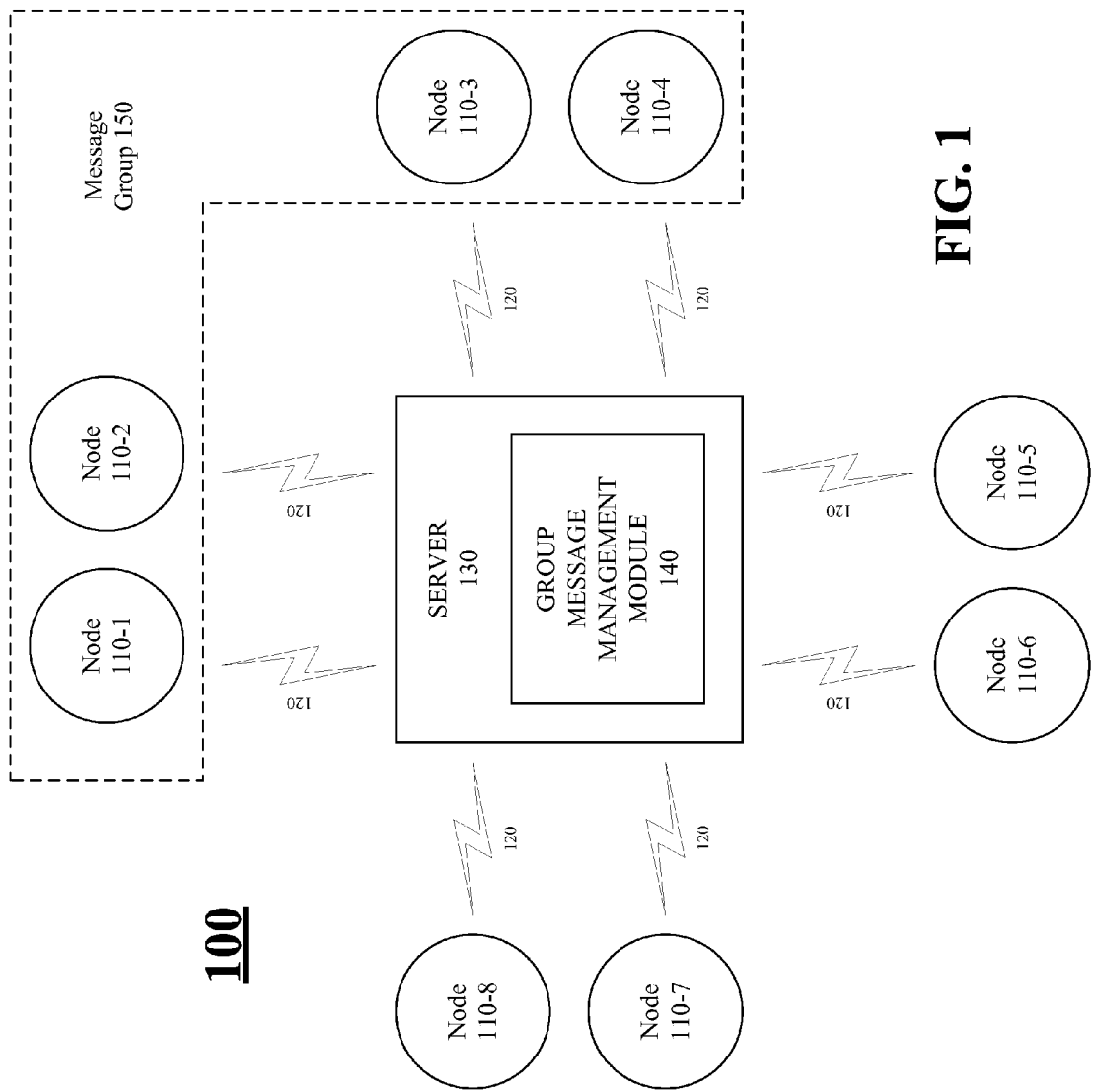
FIG. 1 illustrates one embodiment of a communications system.

Various embodiments may be generally directed to techniques for performing enhanced group messaging between mobile computing devices in a wireless communications system. Some embodiments may be particularly directed to techniques for automatically and/or selectively providing enhanced group messaging services for mobile computing devices while reducing the number of operations or procedures typically needed to establish a group messaging session. In one embodiment, for example, the enhanced group messaging services may provide a messaging experience for an operator that is instantaneous and yet asynchronous.

In one embodiment, a message server may receive a message from any given type of mobile messaging application. The message may include identifying information for multiple mobile computing devices, and in some cases, a group message indicator. The message server may have group message logic arranged to detect and use the identifying information and possibly the group message indicator to create a message group, a message group identifier for the message group, and a message storage queue for the message group. The message server may then use the message group identifier to allow the mobile computing devices in the message group to participate in a many-to-many group message session. The message server may also use the message group identifier to archive messages for the group message session, and provide the archived messages in an asynchronous manner to a mobile computing device joining the group message session sometime after it has been started. In this manner, the message server may automatically create a group messaging session from any type of message and from any type of messaging application, as well as asynchronously provide a group message context for an operator of the mobile computing device joining the group messaging session. Other embodiments are described and claimed.

Various embodiments may provide various advantages for any number of group message use scenarios. For example, multiple mobile computing devices and a message server may cooperatively interoperate to automatically and/or selectively provide group messaging services for different messaging types across different transports. In another example, a message server may allow the mobile computing devices to enter a group message conversation at any time and still be able to see a message history for some or all of the group messaging session. In yet another example, a message server may provide or deliver the messages for a given group messaging session even if an operator or user is not actively using a mobile computing device. In still another example, the messages may be delivered in an asynchronous manner that allows the operator to access them at any time during or after a group messaging session. In yet another example, the group messages may include both text messages and multimedia messages, with the latter message service feature allowing operators to send rich content in the form of various message objects or widgets. In still another example, the message server may also establish a group messaging session without the need for a separate group messaging view, and while reducing or eliminating the need to perform register and login operations for each mobile computing device prior to participating in the group messaging session. These are merely a few advantages and message use scenarios for the various embodiments, and other advantages and use scenarios will be described with reference to specific embodiments below.

FIG. 1 illustrates a block diagram of a communications system 100. In the illustrated embodiment shown in FIG. 1, the communications system 100 may include various communication elements, including multiple communication nodes 110-1-$m$ communicating over wireless shared media 120 with a communications server 130. In one embodiment, the communications elements may communicate information between each other in the form of messages. A message may comprise an object of communication to provide a discrete or defined set of information. Each communication node 110-1-$m$ may be arranged to communicate messages between each other via the communications server 130.

In one embodiment, the communications nodes 110-1-$m$ may comprise, or be implemented as, mobile computing devices 110-1-$m$. The mobile computing devices 110-1-$m$ may be configured to support or provide cellular voice communication, wireless data communication and computing capabilities. The mobile computing devices 110-1-$m$ may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

In one embodiment, the communications server 130 may be implemented as a message server. A message server may comprise a computer system designated for running a specific message server application or applications to provide various messaging services to communicate various types of messages in a variety of formats. Each of the messaging applications may be representative of a particular kind of transport, enabling handling of messages of particular types and formats for the particular application. The message server applications may include without limitation a short message service (SMS) application, a SMS cell broadcast (SMS-CB) application, a multimedia message service (MMS) application, an electronic mail (email) application, an instant messaging (IM) application, a text message application, a voice message application, a video message application, a group message application, a synchronous conferencing application, an asynchronous conferencing application, and so forth. Furthermore, the message server 130 may comprise, or be implemented with, other network infrastructure used by a given messaging application. For example, when the message server 130 implements an SMS application, the message server 130 may be implemented with, or may be arranged to communicate with, various SMS network elements, such as a SMS center (SMSC) designed to deliver SMS messages for a mobile telephone network.

In various embodiments, the message server 130 may be arranged to provide messaging services specifically for various wireless mobile devices, such as the mobile computing devices 110-1-m. For example, the message server 130 may be implemented with wireless capabilities to communicate with the mobile computing devices 110-1-m over the wireless shared media 120. Further, the message server 130 may be implemented to provide voice and/or data communications services for the mobile computing devices 110-1-m via one or more wireless networks. For example, the message server 130 may be implemented as part of, or co-located with, a cellular radiotelephone system or computer network, as described in more detail with reference to FIG. 7.

In various embodiments, the message server 130 may be arranged to provide messaging services in accordance with various messaging protocols. In one embodiment, for example, the message server 130 may be arranged to operate in accordance with various instant messaging and presence technology protocols as promulgated by the Internet Engineering Task Force (IETF), such as the Extensible Messaging and Presence Protocol (XMPP) proposed standards Request For Comment (RFC) 3920 and 3921, its progeny, revisions and variants. XMPP is an open, Extensible Markup Language (XML) type protocol for near-real-time, extensible instant messaging and presence information, also known as "buddy lists." Although some embodiments may implement XMPP, other similar message transports may be used as desired for a given implementation.

The message server 130 may be arranged to provide many-to-many group messaging services, sometimes referred to colloquially as a "group chat" or "online chat," for the mobile computing devices 110-1-m. By way of contrast, many conventional messaging applications are limited to one-to-one interactions or one-to-many interactions. One-to-one communications may refer to the act of an individual communicating information with another individual, such as between the mobile computing devices 110-1, 110-2. Examples of one-to-one communications may include IM services, File Transfer Protocol (FTP) services, email services between individuals, and so forth. One-to-many communications may refer to the act of an individual publishing or broadcasting information to multiple individuals, such as between the mobile computing device 110-1 and the mobile computing devices 110-2-m. Examples of one-to-many communications may include SMS-CB services, email services from one individual to multiple recipients, web services, and so forth. In addition to, or in lieu of, one-to-one and one-to-many communications, the message server 130 may be arranged to provide group messaging services, referred to sometimes as many-to-many communications. Many-to-many communications may refer to the act of multiple individuals communicating information to multiple individuals. Examples of many-to-many communications may include group chat services, online chat services, email services from multiple senders to multiple recipients, and so forth.

In various embodiments, the communications system 100 may be arranged to provide enhanced group messaging services for the various communications elements of the communications system 100. For example, the mobile computing devices 110-1-m and the message server 130 may cooperatively interoperate to provide group messaging services for different messaging types across different transports. Furthermore, the message server 130 may allow the mobile computing devices 110-1-m to enter a group message conversation at any time and still be able to see the message history for the group messaging session. In addition, the message server 130 will provide the messages for a given group messaging session even if an operator or user is not actively using a mobile computing device 110-1-m. For example, the messages may be delivered in an asynchronous manner that allows the operator to access them at any time. The group messages may also include both text messages and multimedia messages, with the latter message service feature allowing operators to send rich content in the form of various message objects or widgets. Further, the message server 130 may establish the group messaging session while reducing or eliminating the need to perform register and login operations for each mobile computing device 110-1-m prior to participating in the group messaging session. These are merely a few advantages of the various embodiments, and other advantages will be described with reference to specific embodiments.

In particular, various embodiments may provide or implement group messaging services, particularly many-to-many group messaging services, in a manner that allows multiple operators to emulate an online chat room through use of one-to-one or one-to-many communication techniques. Further, various embodiments facilitate such group messaging services without having the need to open a separate chat window or chat room, or performing complicated and tedious register and login operations for each mobile computing device 110-1-m prior to participating in the group messaging session.

In one embodiment, for example, the message server 130 may be arranged to communicate messages between multiple mobile computing devices 110-1-m. The message server 130 may include a group message management module 140. The group message management module 140 may comprise, for example, hardware and/or software such as group message logic (e.g., instructions, data, and/or code) to be executed by a logic device (e.g., a host or applications processor). The group message logic may be stored internally or externally to the logic device on one or more types of computer-readable storage media. In various implementations, the group message management module 140 may communicate with a group message rules database 330 arranged to store rules and parameters for controlling the performance of group message operations for different types of messages.

The group message management module 140 may be arranged to automatically and/or selectively establish a group messaging session between the multiple mobile computing devices 110-1-$m$. For example, the group message management module 140 may include a group generating module to receive a message with a group message indicator and identifying information for multiple mobile computing devices 110-1-$m$ within the message. The group generating module may form a message group for the mobile computing devices 110-1-$m$ to communicate messages from any one of the mobile computing devices 110-1-$m$ to all of the mobile computing devices 110-1-$m$ for the group messaging session. An exemplary mobile computing device 110-1-$m$ and an exemplary message server 130 may be described in further detail with reference to respective FIGS. 2 and 3.

Figure 2:
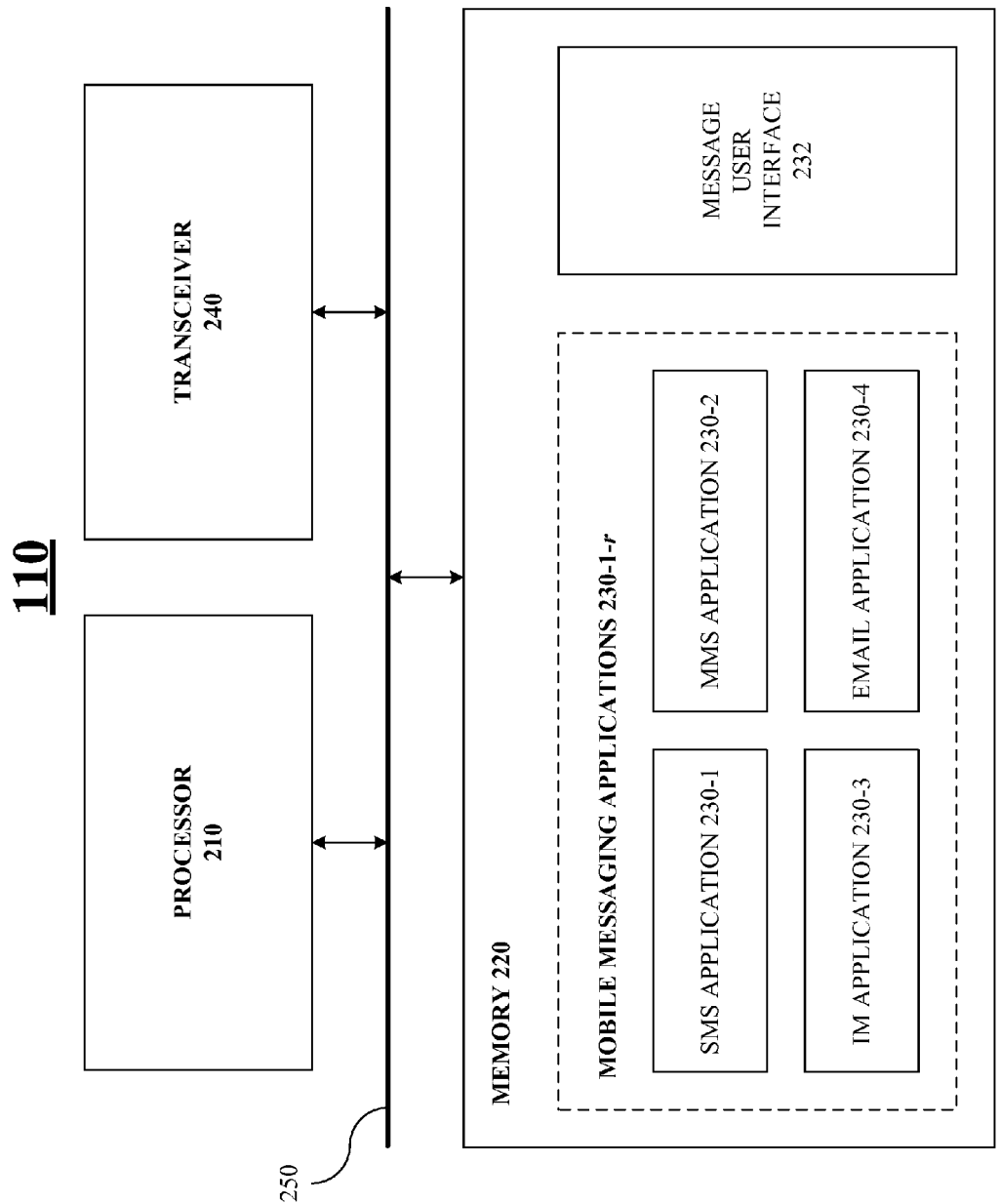
FIG. 2 illustrates one embodiment of a first mobile computing system.

FIG. 2 illustrates a more detailed block diagram for a mobile computing system 110-1-$m$. In the illustrated embodiment shown in FIG. 2, a given mobile computing device 110-1-$m$ may include or implement a processor 210, a memory 220, and a radio transceiver 240, all coupled by a bus 250. The memory 220 may store or instantiate one or more mobile messaging applications 230-1-$r$ and a message user interface 232. The mobile messaging applications 230-1-$r$ may include client-based versions of any of the messaging applications previously described with reference to the message server 130. As shown in FIG. 2 by way of example and not limitation, the mobile messaging applications 230-1-$r$ may include an SMS application 230-1, an MMS application 230-2, an IM application 230-3, and an email application 230-4. Although the illustrated embodiment shown in FIG. 2 includes multiple mobile messaging applications 230-1-$r$ by way of example and not limitation, it may be appreciated that a single (or even a few) mobile messaging application 230-1-$r$ may be used with multiple underlying transports and a shared data schema. In this case, for example, a single mobile messaging application 230 may be used for SMS messages, MMS messages, email messages, IM messages, and so forth. The various computing and communication elements of the mobile computing device 110-1-$m$ as shown in FIG. 2 may be further illustrated and described in the more detailed block diagram of the mobile computing device 110-1-$m$ provided by FIG. 7.

The mobile computing device 110-1-$m$ may comprise or implement various mobile messaging applications 230-1-$r$. The mobile messaging applications 230-1-$r$ may comprise, for example, hardware and/or software such as mobile messaging control logic (e.g., instructions, data, and/or code) to be executed by a logic device (e.g., host or applications processor 210). The logic may be stored internally or externally to the logic device on one or more types of computer-readable storage media. In one or more embodiments, the mobile messaging applications 230-1-$r$ may be implemented as one or more mobile messaging application programming interface (API) commands on the applications processor 210.

In one embodiment, the mobile computing device 110-1-$m$ may be arranged to support cellular voice communication, wireless data communication and computing capabilities. The mobile computing device 110-1-$m$ may include various mobile messaging applications 230-1-$r$ arranged to communicate messages for a group messaging session. For example, the mobile messaging applications 230-1-$r$ may be arranged to initiate a group messaging session by sending an initial message to the message server 130. The initial message may include any type of regular or normal message from any of the mobile messaging applications 230-1-$r$ modified to include at least two data items within the initial message, including: (1) a group message indicator; and (2) identifying information for multiple mobile computing devices 110-1-$m$. In some cases, however, the group message indicator may be omitted as described further below.

In various embodiments, the group message indicator may comprise any control information embedded within the initial message to indicate to the message server 130 that a group message session should be established between multiple participants identified by the identifying information within the initial message. The control information may be implemented as any control word, field, parameter, variable or flag that is understood by the message server 130 to initiate or trigger a group message session.

In various embodiments, the identifying information may comprise any information that uniquely identifies a mobile computing device 110-1-$m$ and may be suitable to direct communications to the mobile computing device 110-1-$m$. Examples for identifying information may include operator information (e.g., first name, a last name, a company/employer name, mailing addresses such as home, work, other, and so forth), telephone numbers (e.g., home, work, mobile, fax, pager), email addresses (e.g., home, work, primary, alternative), IM screen names, SMS identifier, MMS identifier, personal information, notes, globally unique identifier (GUI), universal resource locator (URL), network address, Internet Protocol (IP) address, device address, media access control (MAC) address, source address, destination address, and so forth.

Once a group message session has been established, the mobile messaging applications 230-1-$r$ may be arranged to receive messages from the multiple mobile computing devices 110-1-$m$ from the message server 130. Each message may include a message group identifier for a message group including all of the mobile computing devices 110-1-$m$ identified for that particular group message session.

In addition to the mobile messaging applications 230-1-$r$, the mobile computing device 110-1-$m$ may further include one or more message user interfaces 232. The message user interface 232 may comprise any user interface or graphic user interface (GUI) arranged to generate, provide or display a group chat view for the group messaging session. In some cases, each mobile messaging application 230-1-$r$ may utilize a separate message user interface 232 or multiple user interfaces 232. In other cases, some or all of the mobile messaging applications 230-1-$r$ may utilize an integrated, shared or uniform message user interface 232. In the former case, the SMS application 230-1 may include an SMS group chat view for the group messaging session. An example of an SMS group chat view suitable for use with a group messaging session may be described in more detail with reference to FIG. 5.

Figure 3:
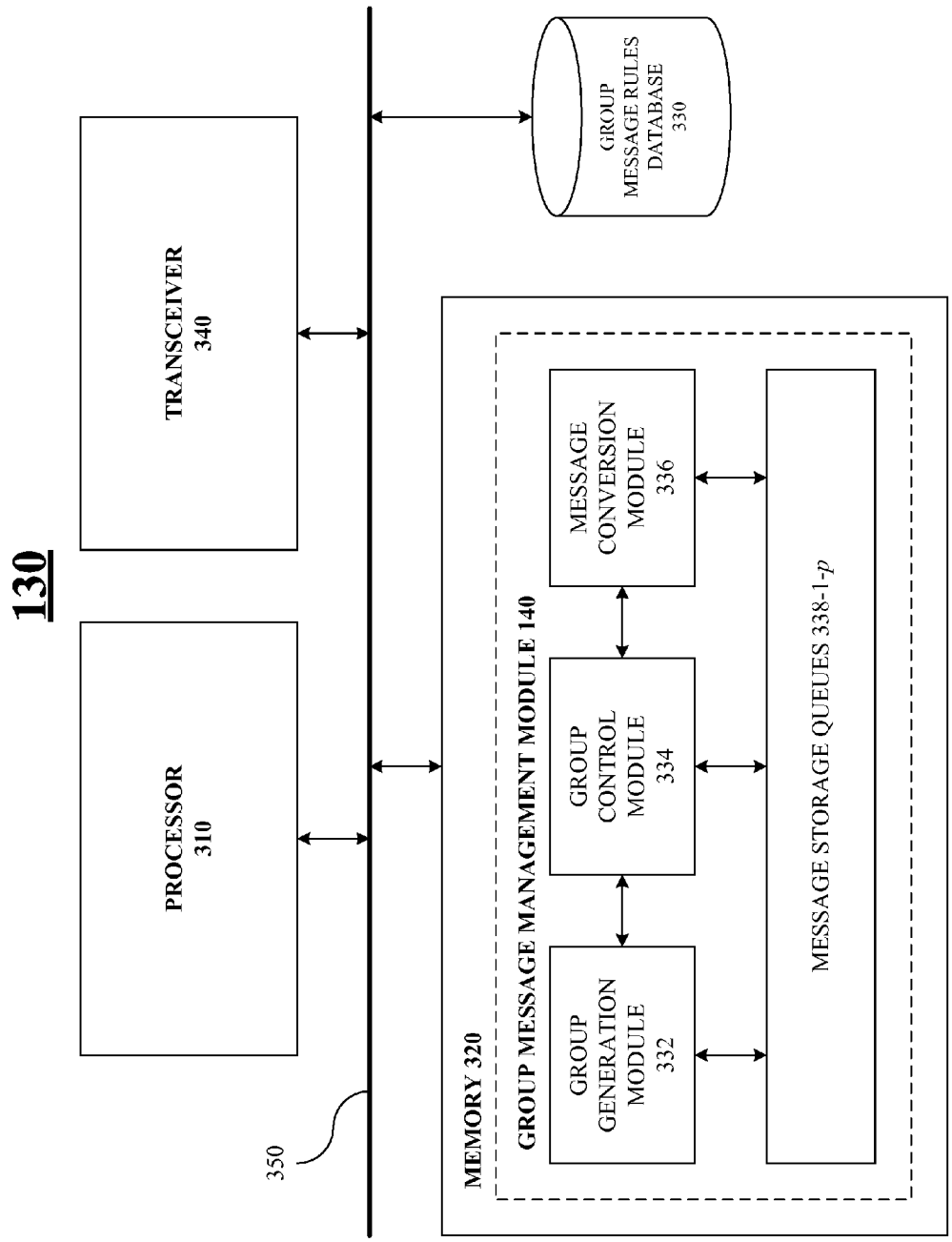
FIG. 3 illustrates one embodiment of a message server.

FIG. 3 illustrates a more detailed block diagram for the message server 130. In the illustrated embodiment shown in FIG. 3, the message server 130 may include or implement a processor 310, a memory unit 320, a radio transceiver 340, and a group message rules database 330, all coupled by a bus 350. The memory 320 may store or instantiate a group message management module 140 as described with reference to FIG. 1. As shown in FIG. 3 by way of example and not limitation, the group message management module 140 may include a group generation module 332, a group control module 334, a message conversion module 336, and one or more message storage queues 338-1-*p*. The various computing and communication elements of the message server 130 as shown in FIG. 3 may be the same or similar to the corresponding elements further illustrated and described in the more detailed block diagram of the mobile computing device 110-1-*m* provided by FIG. 7.

As previously described, the message server 130 may be arranged to automatically and/or selectively establish a group message session between and among various mobile computing devices 110-1-*m*, and communicate messages during the group message session between and among the multiple mobile computing devices 110-1-*m*. The message server 130 may include the group message management module 140. The group message management module 140 may be arranged to establish a group messaging session between multiple mobile computing devices 110-1-*m*, such as the mobile computing devices 110-1-4, for example. The group message management module 140 may include a group generating module 332 to receive a message with a group message indicator and identifying information for multiple mobile computing devices 110-1-4 within the message. The group generating module 332 may form a message group for a set or subset of the mobile computing devices 110-1-*m*, such as a message group 150 (shown in FIG. 1) for the mobile computing devices 110-1-4. The message group 150 may be used to communicate messages from any one of the mobile computing devices 110-1-4 to all of the mobile computing devices 110-1-4 for the group messaging session.

The group message management module 140 implemented by the message server 130 may allow any one of the mobile computing devices 110-1-*m* to initiate a group message session for a message group comprising all or some of the mobile computing devices 110-1-*m*. This may be accomplished without forcing operators for the mobile computing devices 110-1-*m* to undergo the tedious process of performing registration and login service operations prior to joining a group message session.

By way of example, assume an operator of the mobile computing device 110-1 desires to initiate a group message session between various operators for the mobile computing devices 110-2-4. The operator for the mobile computing device 110-1 may launch a mobile messaging application 230-1-*r*, such as the SMS application 230-1, for example. The SMS application 230-1 may generate a SMS group message view using the message user interface 232. The operator of the mobile computing device 110-1 may use the SMS group message view to select an option to generate a group message for a new group message session. The operator may enter or select identifying information for each of the participants in the group message session. For example, the operator may select mobile telephone numbers assigned to each of the operators and/or the mobile computing devices 110-2, 110-3 and 110-4 as participants for the group message session, enter text or multimedia information into the body of the message, and send the message to the message server 130. When a group message option is selected, the SMS application 230-1 may embed a group message indicator within the header or payload of the SMS message, and send the SMS message from the mobile computing device 110-1 to the message server 130 via the transceiver 240.

The message server 130 may receive the SMS message from the mobile computing device 110-1, and begin processing the SMS message to determine whether to automatically initiate a group message session. The group generating module 332 may receive the SMS message with the group message indicator, and detect identifying information for multiple mobile computing devices 110-1-4 within the message. Upon detecting the group message indicator and the identifying information, the group generating module 332 may form a message group 150 (shown in FIG. 1) for the mobile computing devices 110-1-4 using the identifying information. The group generating module 332 may generate a message group identifier for the message group 150. The message group identifier may be any permanent or temporary identifier suitable for uniquely identifying the message group 150 and/or the message group session. The group generating module 332 may then associate the identifying information for the mobile computing devices 110-1-4 with the message group identifier.

Once the message group 150 has been generated, the group generating module 332 may store the message group identifier and the associated identifying information in the memory 320. The group generating module 332 may also establish or generate a message storage queue 338-1-*p* corresponding to the message group identifier. The message storage queue 338-1-*p* may be used to store or archive any messages communicated by the message group 150. For example, the message storage queue 338-1-*p* may be used to store the initial SMS message used to establish the group message session, and any subsequent messages communicated through the message server 130 with the message group identifier. The archived messages stored by the message storage queue 338-1-*p* may be used for any mobile computing devices 110-1-*m* that join or enter the group message session after it has already been started. In this manner, an operator may join the group message session at any time and have convenient access to previous messages communicated between the various mobile computing devices 110-1-*m* prior to the operator joining the group message session.

Once the message group 150 has been generated and a message group identifier assigned, the message server 130 may send the original SMS message with the message group identifier to each mobile computing device 110-1-4 in the message group for the group messaging session. Whenever a mobile computing device 110-1-4 desires to respond to the initial message sent by the mobile computing device 110-1, or send another message to the message group 150 during the group message session, the message will include the message group identifier along with the other information generally contained within a SMS message. The message server 130 may receive messages with the embedded message group identifier, retrieve the message group 150 having the mobile computing devices 110-1-4 and associated identifying information corresponding to the message group identifier, and communicate such messages to all of the mobile computing devices 110-1-4 of the message group 150 using the identifying information. In this manner, the message server 130 may facilitate many-to-many group message sessions on behalf of the mobile computing devices 110-1-4.

In some cases, the group generation module 332 of the group message management module 140 may be arranged to add members to an existing message group. Assume a member of the message group 150 may desire to add a new member to the message group 150. For example, assume the operator of the mobile computing device 110-2 desires to invite the operator of the mobile computing device 110-5 to join the group message session for the message group 150. In this case, the operator of the mobile computing device 110-2 may send a message with identifying information for the mobile computing device 110-5 and the message group identifier for the message group 150 to the mobile computing device 110-5. The message sent from the mobile computing device 110-2 may comprise a new message, or a response to a message received from another member of the message group 150. The operator of the mobile computing device 110-5 may receive the message from the mobile computing device 110-2, and respond to the message with the message group identifier with a message communicated through the message server 130. The group generation module 332 of the group message management module 140 of the message server 130 may receive the message from the mobile computing device 110-5 with the message group identifier for the message group 150. The group generation module 332 may detect identifying information for the new mobile computing device 110-5, and compare the identifying information with the stored message group 150. The comparison may indicate that the identifying information is not included with the stored message group 150, and initiates add operations to add the mobile computing device 110-5 to the message group 150. The group generation module 332 may associate the identifying information for the mobile computing device 110-5 with the message group identifier for the message group 150, thereby updating the message group 150 with the new mobile computing device 110-5.

In some cases, a member of the message group 150 may be unable to immediately receive the messages communicated by the various participants of the message group 150 for various reasons. For example, assume a new mobile computing device 110-1-m (e.g., the mobile computing device 110-5) joins the group message session sometime after the start of the group message session. In another example, assume an original member of the message group 150 is initially turned off or outside communication range of the message server 130 and its extended network as messages are being communicated between the active members of the message group 150. By way of example, assume the mobile computing device 110-4 is initially turned off when the group message session is started. Further assume that at some time during the group message session, the mobile computing device 110-4 is turned on, joins the group message session, and begins receiving messages from the mobile computing devices 110-1, 110-2 and 110-3. The operator of the mobile computing device 110-4, however, may not have any context for the group message session since he or she cannot view any of the previous messages communicated by the message group 150. To reduce or avoid this problem, the message server 130 may detect that the mobile computing device 110-4 has joined the group message session late, and forward any stored messages from the message server 130 to the mobile computing device 110-4.

In various embodiments, the group message management module 140 may include a group control module 334. The group control module 334 may perform various administrative operations for an established group messaging session. One such administrative operation may include storing or archiving any messages communicated by a given member group during the group message session. For example, the group control module 334 may store messages for a group message session using the message storage queue 338-1-$p$ generated by the group generation module 332 when the message group 150 was formed or generated. For example, the group control module 334 may be arranged to store the message with the group message indicator and any messages received with the message group identifier to a corresponding message storage queue 338-1-$p$ for the message group 150. The group control module 334 may detect when a mobile computing device 110-1-$m$ needs previous archived messages for a group message session, retrieve the archived messages from the appropriate message storage queue 338-1-$p$, and send the retrieved archived messages to a mobile computing device 110-1-$m$ (e.g., the mobile computing devices 110-4, 110-5) joining the group messaging session as an existing member or a new member of the message group 150.

In various embodiments, the group control module 334 may provide a varying number or amount of archived messages to a mobile computing device 110-1-$m$ joining a group messaging session after it has been started. For example, a message archive volume parameter may be defined to control how many archived messages are delivered to a joining mobile computing device 110-1-$m$. In one case, the message volume parameter may represent an absolute number of archived messages, such as the last 10 messages. In another case, the message volume parameter may represent a relative number of messages, such as the last 25% of archived messages. In yet another case, the message volume parameter may represent a time period, such as all messages within the last 5 minutes. In still another case, the message volume parameter may represent one or more operators in a message group, such as from the operators of the mobile computing devices 110-1, 110-2. The message volume parameter may be established by the group control module 334 of the message server 130, the originator of the group messaging session (e.g., the mobile computing device 110-1), or one or more participants of the message group. In the last example, an operator of the mobile computing device 110-1-$m$ joining the group messaging system may send the message volume parameter to the group control module 334.

In some cases, the group control module 334 may send the archived messages from the message storage queue 338-1-$p$ in the form of separate or discrete messages. In such cases the receiving mobile computing device 110-1-$m$ may receive the archived messages in sequence in an order approximating the original temporal flow of messages. In other cases, the group control module 334 may send the archived messages from the message storage queue 338-1-$p$ in a form other than separate or discrete messages. For example, the group control module 334 may send the archived messages to a joining mobile computing device 110-1-$m$ in the form of a partial or complete message log or file of archived messages, a URL pointing to a web service with the archived messages, and so forth.

In various embodiments, the group message management module 140 may be capable of communicating different messages from different message applications and message transports for a given message group during a group messaging session. In one embodiment, for example, the group message management module 140 may include a message conversion module 336. The message conversion module 336 may be arranged to convert a message with a given message group identifier from a first message type to a second message type. For example, assume the mobile computing device 110-2 utilizes an SMS application 230-1 to communicate messages with the other mobile computing devices 110-1-$m$ of the message group 150, while the mobile computing device 110-3 utilizes an email application 230-4 to communicate such messages. Since the mobile computing devices 110-2, 110-3 utilize different message applications or transports, the mobile computing devices 110-2, 110-3 may be unable to read each others messages. To solve this and similar problems, the message conversion module 336 may be arranged to perform message conversion operations to convert a message from one message format to another message format. Similarly, the message conversion module 336 may also be arranged to perform protocol conversion operations to convert a message sent with one type of protocol to a message compatible with a second type of protocol. In this manner, the mobile computing devices 110-2, 110-3 may both participate in the group messaging session using their respective device configurations and available messaging applications.

Although some embodiments have been described using both a group message indicator and identifying information to automatically initiate or establish a group message session, some embodiments may omit the need for a group message indicator to be embedded within the initial message. For example, the message server 130 may implement various message policy rules and parameters for controlling the performance of the group message management module 140, with one or more message policy rules and parameters directed to determining when to initiate a group message session. The message policy rules and parameters may be stored by the group message rules database 330, for example, and the group message management module 140 may communicate with the group message rules database 360 for different types of messages and/or message applications.

Any number of message policy rules and parameters may be defined to control when a message group and a group messaging session is automatically established by the group message management module 140 in response to a received message or message transport. By way of example, a default message policy rule may include initiating a group message session whenever identifying information for multiple recipients is present within a message. In another example, a message policy rule may include initiating a group message session whenever certain identifying information is present within a message, such as a given source address or destination address. In yet another example, a message policy rule may include initiating a group message session whenever one or more operators of the mobile computing devices 110-1-$m$ are under a certain age threshold. In still another example, a message policy rule may include initiating a group message session whenever a message includes identifying information for a certain threshold number of mobile computing devices 110-1-$m$, such as at least three mobile computing devices 110-1-$m$. It may be appreciated that these are merely a few of the message policy rules that may be implemented for a given embodiment. Other message policy rules may be implemented as conditional triggers to establish a group message session as desired for a given set of design parameters and performance constraints. The embodiments are not limited in this context.

Figure 4:
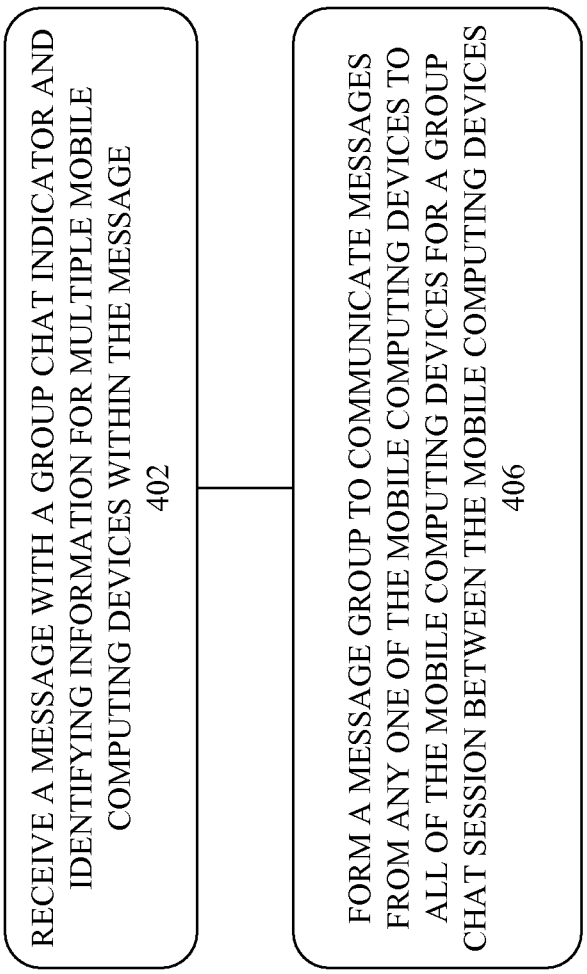
FIG. 4 illustrates one embodiment of a logic flow.

FIG. 4 illustrates a logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic (e.g., instructions, data, and/or code) to be executed by a logic device. For purposes of illustration, and not limitation, the logic flow 400 is described with reference to FIGS. 1-3.

The logic flow 400 may illustrate various operations for the communications system 100 in general, and the mobile computing devices 110-1-$m$ and the message server 130 in particular. For example, the logic flow 400 may illustrate operations for the group message management module 140 to manage group message operations for the message server 130. As shown in FIG. 4, the logic flow 400 may receive a message with a group message indicator and identifying information for multiple mobile computing devices within the message at block 402. The logic flow 400 may form a message group to communicate messages from any one of the mobile computing devices to all of the mobile computing devices for a group messaging session between the mobile computing devices at block 404. The embodiments are not limited in this context.

In one embodiment, the logic flow 400 may receive a message with a group message indicator and identifying information for multiple mobile computing devices within the message at block 402. For example, the group generation module 332 of the group message management module 140 may receive a message with a group message indicator and identifying information for multiple mobile computing devices 110-1-$m$ within the message. As previously described, assume the mobile computing device 110-1 sends a SMS message with identifying information for the mobile computing devices 110-2, 110-3 and 110-4 as recipients, as well as identifying information for the mobile computing device 110-1 as the sender. The identifying information may comprise, for example, a mobile telephone number for the mobile computing device 110-1, an email address for the mobile computing device 110-2, an IP address for the mobile computing device 110-3, and a SMS identifier for the mobile computing device 110-4.

In one embodiment, the logic flow 400 may form a message group to communicate messages from any one of the mobile computing devices to all of the mobile computing devices for a group messaging session between the mobile computing devices at block 404. For example, the group generation module 332 may form a message group 150 to communicate messages from any one of the mobile computing devices 110-1-4 to all of the mobile computing devices 110-1-4 for a group messaging session between the mobile computing devices 110-4. The group messaging session may comprise a many-to-many group messaging session, where a message from the mobile computing device 110-1 is received by the mobile computing devices 110-2-4, a message from the mobile computing device 110-2 is received by the mobile computing devices 110-1, 110-3 and 110-4, a message from the mobile computing device 110-3 is received by the mobile computing devices 110-1, 110-2 and 110-4, and so forth.

In one embodiment, the group generation module 332 may form a message group in a number of different ways. For example, the group generation module 332 may detect the identifying information for the mobile computing devices 110-1-$m$ embedded within a message. The group generation module 332 may form the message group with the identifying information, and generate a message group identifier for the message group. The group generation module 332 may send the message with the message group identifier to each mobile computing device in the message group for the group messaging session. The message server 130 may then communicate any messages received with the message group identifier to all of the mobile computing devices of the message group via the transceiver 340.

Figure 5:
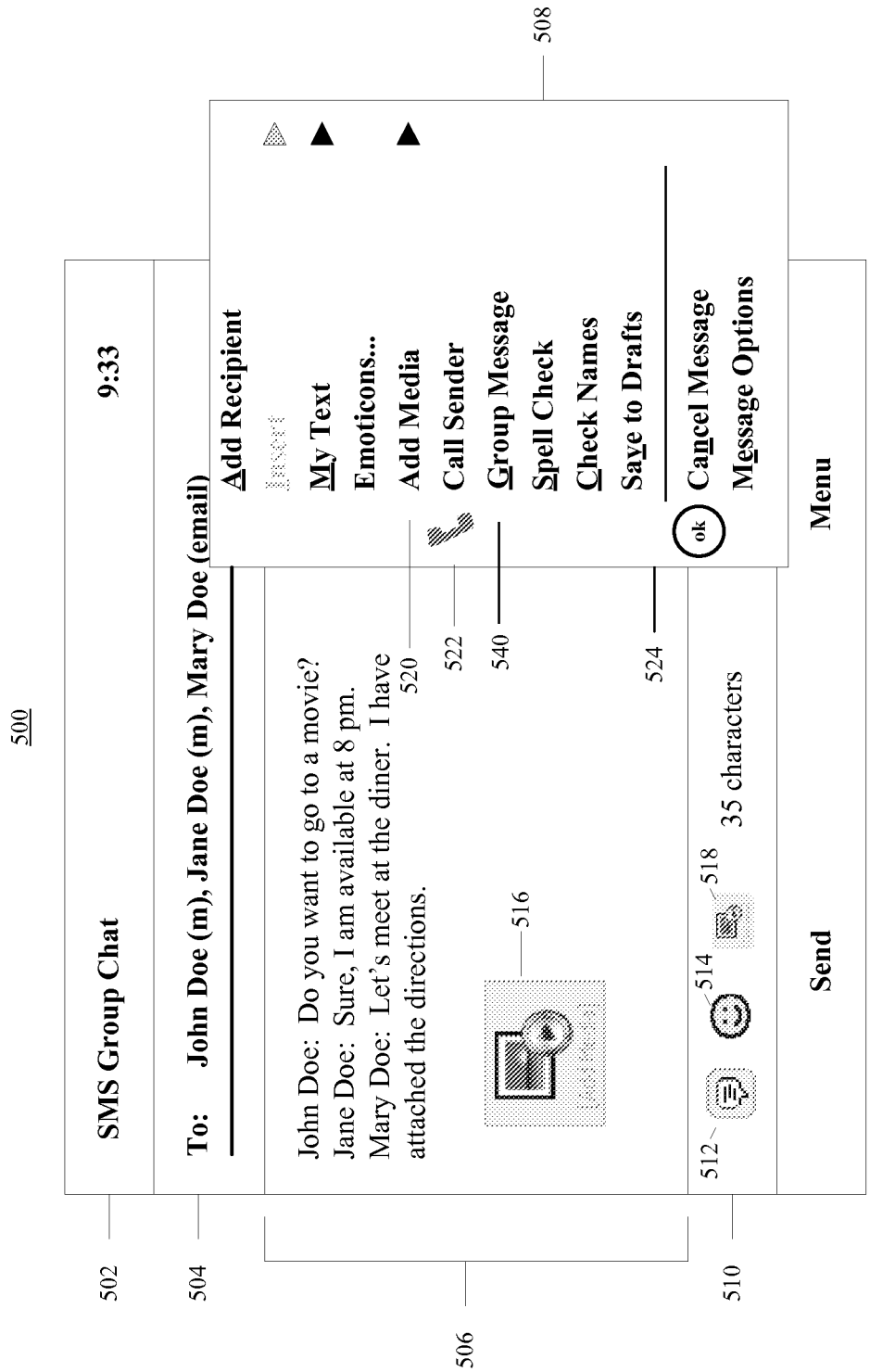
FIG. 5 illustrates one embodiment of a graphics user interface view.

FIG. 5 illustrates a messaging UI 500 in accordance with one or more embodiments which may be displayed to an operator or user of the mobile computing devices 110-1-$m$ of FIGS. 1 and 2. In various embodiments, the messaging UI 500 may be supported by an application such as an SMS application 230-1. For example, the messaging UI 500 may comprise an SMS group messaging view UI. The embodiments, however, are not limited in this context.

As shown, the messaging UI 500 may comprise a title bar 502 for displaying the title of a particular messaging application and the current time. The messaging UI 500 also may comprise an address bar 504. As shown, the address bar 504 may comprise a "To" field which may display the contact name (e.g., John Doe, Jane Doe, Mary Doe) through reverse look up in the contact records or the telephone number of the recipient. In some cases, the address bar 504 may comprise other items such as a "CC" field, a "BCC" field, a subject field, contact picture, status line (e.g., message priority, receipt status, errors, receipt request, validity period), callback number, vCard, vCal, and so forth.

The messaging UI 500 may comprise a message composition area 506 for entering message text. The messaging UI 500 may be arranged to display a menu 508 in response to pressing a menu button or by tapping and holding the screen, for example. Exemplary items or soft keys for the menu 508 may include, without limitation, Group Message, Send, Add Recipient, Insert, My Text, Emoticons, Add Media, Add Picture, Add Video, Add Sound, Pick Sound, Record Sound, Add Callback Number, Add vCard, Add vCal, Clear, Select All, Paste, Copy, Cut, Undo, Save to Drafts, Save as Template, Spell Check, Check Names, Cancel Message, Message Options, and so forth.

The messaging UI 500 may comprise a status bar 510. As shown, the status bar 510 may comprise a text button 512 for displaying a pop-up list of boilerplate text strings that can be inserted into messages and edited. The status bar 510 may comprise an emoticon button 514 to display a pop-up of emoticons that can be inserted into the text area.

In various embodiments, the messaging UI 500 may allow the user to add media objects such as pictures, video, and/or sounds to a message. In some embodiments, for example, the message composition area 506 may comprise one or more add media button and/or an add media soft key. For example, the message composition area 506 may comprise an add media button 516, the status bar 510 may comprise an add media button 518, and/or the menu 508 may comprise an Add Media soft key 520. The embodiments are not limited in this context.

When the user selects to add media, the user may be presented with a picture/video recorder picker and/or a sound recorder or picker. In some cases, the user may be presented with an intermittent dialog warning the user about the fact that the messaging service might charge more for delivering media objects.

In various embodiments, the messaging UI 500 may enable a user to compose messages of different types of formats using the same unified messaging UI. In one embodiment, for example, the messaging UI 500 may comprise a unified messaging UI for SMS messages and MMS messages. In such an embodiment, after a media object has been added to the message, the messaging UI 500 may undergo an automatic or seamless conversion for supporting the transmission of the media objects. For example, the messaging UI 500 may automatically or seamless convert from an SMS messaging UI to an MMS messaging UI, and the message will be sent as an MMS message. In the event that the user adds a media object and then removes the media object, the messaging UI 500 may automatically or seamless convert back from an MMS messaging UI to an SMS messaging UI. If the user does not add any media to the message, conversion does not take place, and the message may be sent as an SMS message. The embodiments, however, are not limited to this example.

In this embodiment, the messaging 500 UI may comprise a unified messaging UI supporting composition of SMS messages and MMS messages. It can be appreciated that the embodiments are not limited in this context and that the unified messaging UI may be implemented to support using various types of messages as well as various types of supporting messaging applications. In some implementations, for example, the message options soft key may enable the user to select among various types of message conversions and/or delivery methods for sending a composed message. In such implementations, the user may compose a message in one format (e.g., SMS) and then convert or send the message in another format (e.g., MMS, e-mail, IM, etc.) In some cases, the conversion of a message from one format to a particular sending format may be based on programmed and/or detected preferences, constraints, and/or availability of a recipient to receive messages of a certain format. The embodiments are not limited in this context.

As shown in FIG. 5, the menu 508 may comprise icons associated with certain menu items or soft keys. In this embodiment, for example, the menu 508 comprises a talk button icon 522 associated with and displayed next to the Call Sender soft key. The menu 508 also comprises an "ok" button icon 524 associated with and displayed next to the Cancel Message soft key. In such an embodiment, the mobile computing device may comprise a talk hardware button and an "ok" hardware button.

As further shown in FIG. 5, the menu 508 may comprise a "Group Message" soft key 540. The Group Message soft key 540 may be selected whenever an operator desires to establish a many-to-many group messaging session with the participants entered in the "To" field. The Group Message soft key 540 may generate and embed a group message indicator in the message prior to sending the message to the message server 130.

Figure 6:
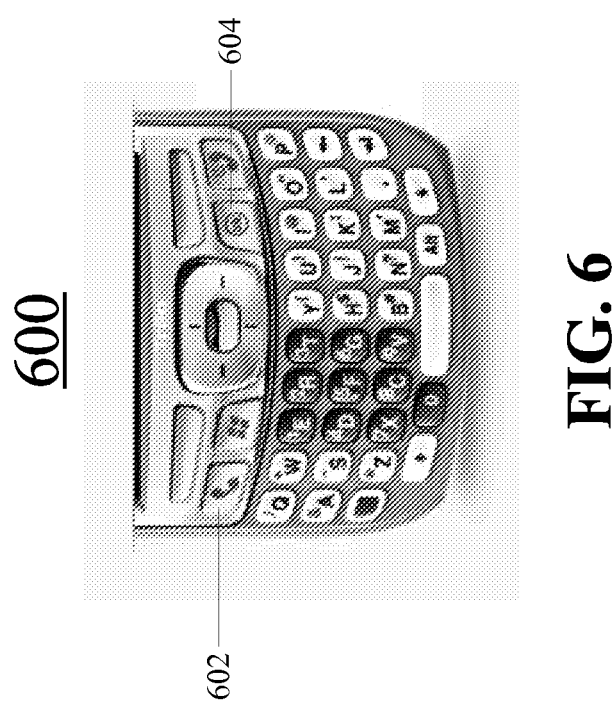
FIG. 6 illustrates one embodiment of an input device.

FIG. 6 illustrates one embodiment of an input device. FIG. 6 illustrates a keypad 600 in accordance with one or more embodiments which may be implemented by the mobile computing device 100. As shown, the keypad 600 may comprise various hardware buttons including a talk button 602 and an "ok" button 604. In various embodiments, while in compose mode, the user may call the sender by selecting the Call Sender menu item in the menu 508 of the messaging UI 500 and/or by pressing the talk hardware button 602 on the keypad 600. Likewise, the user may cancel a message by selecting the Cancel Message menu item in the menu 508 of the messaging UI 500 and/or by pressing the "ok" hardware button 604 on the keypad 600. Accordingly, in such embodiments, the talk button icon 522 and the "ok" button icon 524 may serve to educate the user as to alternative, easier, and/or quicker ways to perform various messaging operations. The embodiments are not limited in this context.

In various embodiments, the message server 130 is described as the initiator and moderator for a group messaging session. In some embodiments, however, some or all of the operations performed by the message server 130 may be implemented by one of the mobile computing devices 110-1-*m*. In one embodiment, for example, the group message management module 140 may be implemented with one or more of the mobile computing devices 110-1-*m*. Whenever a mobile computing device 110-1-*m* desires to initiate a group messaging session, the operations performed by the message management module may be performed by the initiating mobile computing device 110-1-*m*. For example, the mobile computing device 110-1 may initiate a group messaging session by using the message user interface 232 as previously described. Prior to sending the initial message, however, the initial message may be processed by the group message management module 140 implemented by the mobile computing device 110-1. For example, the group generation module 332 may detect identifying information for the multiple mobile computing devices 110-1-$m$ within the message, including the source mobile computing device 110-1 and any recipient mobile computing devices 110-2-$m$. The group generation module 332 may form the message group with the identifying information, and generate a message group identifier for the message group. The mobile computing device 110-1 may send the message with the message group identifier to each mobile computing device 110-2-$m$ in the message group for the group messaging session. Whenever the mobile computing device 110-1 receives any messages with the message group identifier, it can forward the message to the enter message group. Furthermore, the group control module 336 can maintain a message storage queue 338-1-$p$ for the message group and/or group messaging session for whenever an existing or new mobile computing device 110-2-$m$ joins the group messaging session.

In some cases, only partial operations for the group messaging management module 140 may need to be implemented by a mobile computing device 110-1-$m$. For example, since a mobile computing device 110-1-$m$ initiating the group messaging session knows the recipients for the message already, the group control module 336 may be modified to forward any messages received from the recipients to the other recipients on the initial distribution list. In this manner, one of the mobile computing devices 110-1-$m$ may be enabled to initiate and moderate a group messaging session for multiple mobile computing devices 110-1-$m$, including itself.

Figure 7:
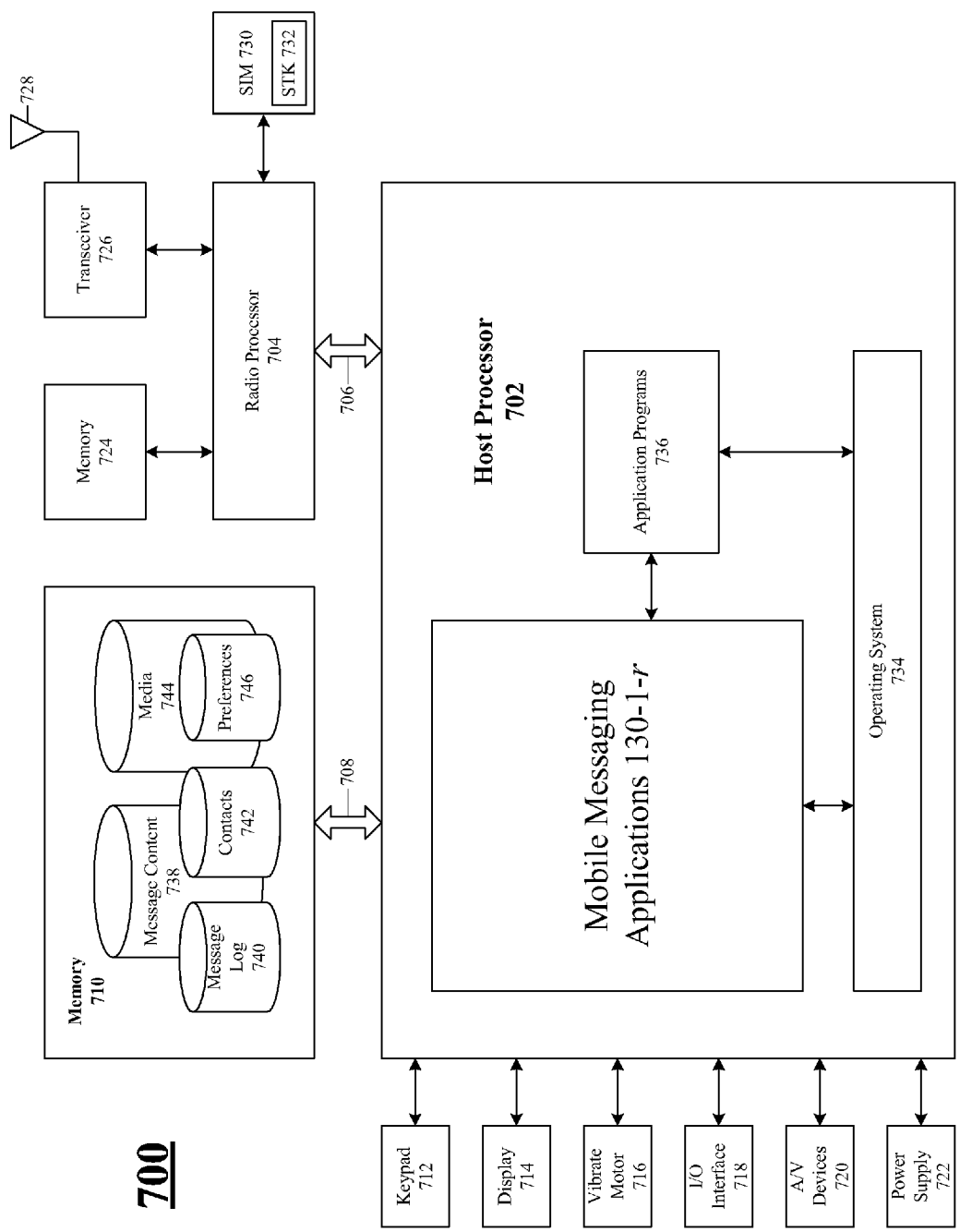
FIG. 7 illustrates one embodiment of a second mobile computing device.

FIG. 7 illustrates a block diagram of a mobile computing device 700 suitable for implementing various embodiments, including the mobile computing devices 110-1-$m$. It may be appreciated that the mobile computing device 700 is only one example of a suitable mobile computing environment and is not intended to suggest any limitation as to the scope of use or functionality of the embodiments. Neither should the mobile computing device 700 be interpreted as having any dependency or requirement relating to any one or combination of components illustrated in the exemplary mobile computing device 700.

The mobile computing device 700 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, the mobile computing device 700 may be arranged to provide mobile packet data communications functionality in accordance with different types of cellular radiotelephone systems. Examples of cellular radiotelephone systems offering mobile packet data communications services may include GSM with General Packet Radio Service (GPRS) systems (GSM/GPRS), CDMA/1xRTT systems, Enhanced Data Rates for Global Evolution (EDGE) systems, Evolution Data Optimized (EVDO) systems, Evolution For Data and Voice (EVDV) systems, High Speed Downlink Packet Access (HSDPA) systems, High Speed Uplink Packet Access (HSUPA), and so forth.

The mobile computing device 700 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.1a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 700 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 7, the mobile computing device 700 may comprise a dual processor architecture including a host processor 702 and a radio processor 704. In various implementations, the host processor 702 and the radio processor 704 may be arranged to communicate with each other using interfaces 706 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 702 may be responsible for executing various software programs such as system programs and applications programs to provide computing and processing operations for the mobile computing device 700. The radio processor 704 may be responsible for performing various voice and data communications operations for the mobile computing device 700 such as transmitting and receiving voice and data information over one or more wireless communications channels. Although the mobile computing device 700 is shown with a dual-processor architecture, it may be appreciated that the mobile computing device 700 may use any suitable processor architecture and/or any suitable number of processors in accordance with the described embodiments. In one embodiment, for example, the processors 702, 704 may be implemented using a single integrated processor.

The host processor 702 may be implemented as a host central processing unit (CPU) using any suitable processor or logic device, such as a as a general purpose processor. The host processor 702 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 702 may be coupled through a memory bus 708 to a memory 710. The memory bus 708 may comprise any suitable interface and/or bus architecture for allowing the host processor 702 to access the memory 710. Although the memory 710 may be shown as being separate from the host processor 702 for purposes of illustration, it is worthy to note that in various embodiments some portion or the entire memory 710 may be included on the same integrated circuit as the host processor 702. Alternatively, some portion or the entire memory 710 may be disposed on an integrated circuit or other medium (e.g., hard disk drive) external to the integrated circuit of the host processor 702. In various embodiments, the mobile computing device 700 may comprise an expansion slot to support a multimedia and/or memory card, for example.

The memory 710 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 700 may comprise an alphanumeric keypad 712 coupled to the host processor 702. The keypad 712 may comprise, for example, a QWERTY key layout and an integrated number dial pad. The mobile computing device 700 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 712 may comprise a physical keypad using hard buttons, or a virtual keypad using soft buttons displayed on a display 714.

The mobile computing device 700 may comprise a display 714 coupled to the host processor 702. The display 714 may comprise any suitable visual interface for displaying content to a user of the mobile computing device 700. In one embodiment, for example, the display 714 may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The mobile computing device 700 may comprise a vibrate motor 716 coupled to the host processor 702. The vibrate motor 716 may be enable or disabled according to the preferences of the user of the mobile computing device 700. When enabled, the vibrate motor 716 may cause the mobile computing device 700 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 700 may comprise an input/output (I/O) interface 718 coupled to the host processor 702. The I/O interface 718 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 700 may be arranged to synchronize information with a local computer system.

The host processor 702 may be coupled to various audio/video (A/V) devices 720 that support A/V capability of the mobile computing device 700. Examples of A/V devices 720 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 702 may be coupled to a power supply 722 arranged to supply and manage power to the elements of the mobile computing device 700. In various embodiments, the power supply 722 may be implemented by a rechargeable battery, such as a removable and rechargeable lithium ion battery to provide direct current (DC) power, and/or an alternating current (AC) adapter to draw power from a standard AC main power supply.

The radio processor 704 may be arranged to communicate voice information and/or data information over one or more assigned frequency bands of a wireless communication channel. The radio processor 704 may be implemented as a communications processor using any suitable processor or logic device, such as a modem processor or baseband processor. The radio processor 704 may also be implemented as a digital signal processor (DSP), media access control (MAC) processor, or any other type of communications processor in accordance with the described embodiments. The radio processor 704 may perform analog and/or digital baseband operations for the mobile computing device 700. For example, the radio processor 704 may perform digital-to-analog conversion (DAC), analog-to-digital conversion (ADC), modulation, demodulation, encoding, decoding, encryption, decryption, and so forth.

The mobile computing device 700 may comprise a memory 724 coupled to the radio processor 704. The memory 724 may be implemented using any of the computer-readable media described with reference to the memory 710. The memory 724 may be typically implemented as flash memory and secure digital (SD) RAM. Although the memory 724 may be shown as being separate from the radio processor 704, some or all of the memory 724 may be included on the same IC as the radio processor 704.

The mobile computing device 700 may comprise a transceiver module 726 coupled to the radio processor 704. The transceiver module 726 may comprise one or more transceivers arranged to communicate using different types of protocols, communication ranges, operating power requirements, RF sub-bands, information types (e.g., voice or data), use scenarios, applications, and so forth. In various embodiments, the transceiver module 726 may comprise one or more transceivers arranged to support voice communications and/or data communications for the wireless network systems or protocols as previously described. In some embodiments, the transceiver module 726 may further comprise a Global Positioning System (GPS) transceiver to support position determination and/or location-based services.

The transceiver module 726 generally may be implemented using one or more chips as desired for a given implementation. Although the transceiver module 726 may be shown as being separate from and external to the radio processor 704 for purposes of illustration, it is worthy to note that in various embodiments some portion or the entire transceiver module 726 may be included on the same integrated circuit as the radio processor 704. The embodiments are not limited in this context.

The mobile computing device 700 may comprise an antenna system 728 for transmitting and/or receiving electrical signals. As shown, the antenna system 728 may be coupled to the radio processor 704 through the transceiver module 726. The antenna system 728 may comprise or be implemented as one or more internal antennas and/or external antennas.

The mobile computing device 700 may comprise a subscriber identity module (SIM) 730 coupled to the radio processor 704. The SIM 730 may comprise, for example, a removable or non-removable smart card arranged to encrypt voice and data transmissions and to store user-specific data for allowing a voice or data communications network to identify and authenticate the user. The SIM 730 also may store data such as personal settings specific to the user. In some embodiments, the SIM 730 may be implemented as an UMTS universal SIM (USIM) card or a CDMA removable user identity module (RUIM) card. The SIM 730 may comprise a SIM application toolkit (STK) 732 comprising a set of programmed commands for enabling the SIM 730 to perform various functions. In some cases, the STK 732 may be arranged to enable the SIM 730 to independently control various aspects of the mobile computing device 700.

As mentioned above, the host processor 702 may be arranged to provide processing or computing resources to the mobile computing device 700. For example, the host processor 702 may be responsible for executing various software programs including system programs such as operating system (OS) 734 and application programs 736. System programs generally may assist in the running of the mobile computing device 700 and may be directly responsible for controlling, integrating, and managing the individual hardware components of the computer system. The OS 734 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 700 may comprise other system programs such as device drivers, programming tools, utility programs, software libraries, application programming interfaces (APIs), and so forth.

Application programs 736 generally may allow a user to accomplish one or more specific tasks. In various implementations, the application programs 736 may provide one or more graphical user interfaces (GUIs) to communicate information between the mobile computing device 700 and a user. In some embodiments, application programs 736 may comprise upper layer programs running on top of the OS 734 of the host processor 702 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 736 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 700 may implement other types of applications in accordance with the described embodiments.

The mobile computing device 700 may include various databases implemented in the memory 710. For example, the mobile computing device 700 may include a message content database 738, a message log database 740, a contacts database 742, a media database 744, a preferences database 746, and so forth. The message content database 738 may be arranged to store content and attachments (e.g., media objects) for various types of messages sent and received by one or more messaging applications. The message log 740 may be arranged to track various types of messages which are sent and received by one or more messaging applications. The contacts database 742 may be arranged to store contact records for individuals or entities specified by the user of the mobile computing device 700. The media database 744 may be arranged to store various types of media content such as image information, audio information, video information, and/or other data. The preferences database 746 may be arranged to store various settings such as rules and parameters for controlling the operation of the mobile computing device 700.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the embodiments.

The invention claimed is:

1. An apparatus comprising:
a group message management module having a group generating module to receive a message and in response automatically form a message group of a plurality of mobile computing devices to communicate the received message to all mobile computing devices of the message group and automatically initiate a group messaging session between the plurality of mobile computing devices of the message group in accordance with one or more message policy rules based on information identified in association with the received message, wherein the group messaging session allows any of the plurality of mobile computing devices of the message group to communicate a message to all other mobile computing devices of the message group; and
the group message management module having a group control module to forward any other messages received from mobile computing devices of the message group to other mobile computing devices of the message group.

2. The apparatus of claim 1, wherein the one or more message policy rules controls automatic initiation of the group messaging session when the information identified in association with the received message comprises information that one or more operators of the plurality of mobile computing devices are under a certain age threshold.

3. The apparatus of claim 1, wherein the one or more message policy rules controls automatic initiation of the group messaging session when the information identified in association with the received message comprises information that a certain source address or a certain destination address are present within the received message.

4. The apparatus of claim 1, wherein the one or more message policy rules controls automatic initiation of the group messaging session when the information identified in association with the received message comprises information that the received message includes identifying information for a certain threshold number of mobile computing devices.

5. The apparatus of claim 1, wherein the received message does not include a group message indicator and the group messaging management module automatically initiates the group messaging session in response to the received message under control of the one or more message policy rules without further direction by a sender of the received message.

6. The apparatus of claim 1, wherein the group messaging management module is implemented by a mobile computing device of the plurality of mobile computing devices of the message group.

7. The apparatus of claim 1, wherein the group messaging management module is implemented by a message server operable to communicate messages between the mobile computing devices of the plurality of mobile computing devices.

8. The apparatus of claim 1, the group control module to store messages for the group messaging session in a message storage queue.

9. The apparatus of claim 8, the group control module to send archived messages stored by the message storage queue for the message group to a mobile computing device within the message group.

10. A method comprising:
receiving, by a group message management module having a group generating module and a group control module, a message;
automatically forming, by the group generating module, a message group of a plurality of mobile computing devices to communicate the received message to all mobile computing devices of the message group in response to receiving the message;
automatically initiating, by the group generating module, a group messaging session between the plurality of mobile computing devices of the message group in accordance with one or more message policy rules based on information identified in association with the received message in response to receiving the message, wherein the group messaging session allows any of the plurality of mobile computing devices of the message group to communicate a message to all other mobile computing devices of the message group; and forwarding, by the group control module, any other messages received from mobile computing devices of the message group to other mobile computing devices of the message group.

11. The method of claim 10, wherein the one or more message policy rules controls automatic initiation of the group messaging session when the information identified in association with the received message comprises information that one or more operators of the plurality of mobile computing devices are under a certain age threshold.

12. The method of claim 10, wherein the one or more message policy rules controls automatic initiation of the group messaging session when the information identified in association with the received message comprises information that a certain source address or a certain destination address are present within the received message.

13. The method of claim 10, wherein the one or more message policy rules controls automatic initiation of the group messaging session when the information identified in association with the received message comprises information that the received message includes identifying information for a certain threshold number of mobile computing devices.

14. The method of claim 10, wherein the received message does not include a group message indicator and the group messaging management module automatically initiates the group messaging session in response to the received message under control of the one or more message policy rules without further direction by a sender of the received message.

15. The method of claim 10, wherein the group messaging management module is implemented by a mobile computing device of the plurality of mobile computing devices of the message group.

16. The method of claim 10, wherein the group messaging management module is implemented by a message server operable to communicate messages between the mobile computing devices of the plurality of mobile computing devices.

17. The method of claim 10, further comprising:
storing, by the group control module, messages for the group messaging session in a message storage queue.

18. The method of claim 17, further comprising:
sending, by the group control module, archived messages stored by the message storage queue for the message group to a mobile computing device within the message group.

19. A non-transitory computer-readable storage medium comprising instructions that, when executed, enable a computing system to:
receive, by a group message management module having a group generating module and a group control module, a message;
automatically form, by the group generating module, a message group of a plurality of mobile computing devices to communicate the received message to all mobile computing devices of the message group in response to receiving the message;
automatically initiate, by the group generating module, a group messaging session between the plurality of mobile computing devices of the message group in accordance with one or more message policy rules based on information identified in association with the received message in response to receiving the message, wherein the group messaging session allows any of the plurality of mobile computing devices of the message group to communicate a message to all other mobile computing devices of the message group; and
forward, by the group control module, any other messages received from mobile computing devices of the message group to other mobile computing devices of the message group.

20. The non-transitory computer-readable storage medium of claim 19, wherein the one or more message policy rules controls automatic initiation of the group messaging session when the information identified in association with the received message comprises information that one or more operators of the plurality of mobile computing devices are under a certain age threshold.

21. The non-transitory computer-readable storage medium of claim 19, wherein the one or more message policy rules controls automatic initiation of the group messaging session when the information identified in association with the received message comprises information that a certain source address or a certain destination address are present within the received message.

22. The non-transitory computer-readable storage medium of claim 19, wherein the one or more message policy rules controls automatic initiation of the group messaging session when the information identified in association with the received message comprises information that the received message includes identifying information for a certain threshold number of mobile computing devices.

23. An apparatus comprising:
means for receiving a message;
means for automatically forming a message group of a plurality of mobile computing devices to communicate the received message to all mobile computing devices of the message group in response to receiving the message;
means for automatically initiating a group messaging session between the plurality of mobile computing devices of the message group in accordance with one or more message policy rules based on information identified in association with the received message in response to receiving the message, wherein the group messaging session allows any of the plurality of mobile computing devices of the message group to communicate a message to all other mobile computing devices of the message group; and
means for forwarding any other messages received from mobile computing devices of the message group to other mobile computing devices of the message group.

24. The apparatus of claim 23, wherein the one or more message policy rules controls automatic initiation of the group messaging session when the information identified in association with the received message comprises information that one or more operators of the plurality of mobile computing devices are under a certain age threshold.

25. The apparatus of claim 23, wherein the one or more message policy rules controls automatic initiation of the group messaging session when the information identified in association with the received message comprises information that a certain source address or a certain destination address are present within the received message.

26. The apparatus of claim 23, wherein the one or more message policy rules controls automatic initiation of the group messaging session when the information identified in association with the received message comprises information that the received message includes identifying information for a certain threshold number of mobile computing devices.

27. The apparatus of claim 1, wherein the message group of a plurality of mobile computing devices is automatically formed without the plurality of mobile computing devices registering with the group message management module.

28. The method of claim 10, wherein the message group of a plurality of mobile computing devices is automatically formed without the plurality of mobile computing devices registering with the group message management module.

29. The non-transitory computer-readable storage medium of claim 19, wherein the message group of a plurality of mobile computing devices is automatically formed without the plurality of mobile computing devices registering with the group message management module.

30. The apparatus of claim 23, wherein the message group of a plurality of mobile computing devices is automatically formed without the plurality of mobile computing devices registering with the group message management module.

\* \* \* \* \*